United States Patent [19]
Neilsen

[11] 4,041,751
[45] Aug. 16, 1977

[54] BURRING DEVICE WITH OPPOSITELY ACTING DEBURRING ELEMENTS

[76] Inventor: Hildaur L. Neilsen, 2 Juniper St., Metuchen, N.J. 08840

[21] Appl. No.: 723,489

[22] Filed: Sept. 15, 1976

[51] Int. Cl.² .............................................. B21J 7/32
[52] U.S. Cl. ........................................ 72/199; 72/407; 72/DIG. 20
[58] Field of Search .......... 72/199, 407, 203, DIG. 20

[56] References Cited
U.S. PATENT DOCUMENTS

| | | | |
|---|---|---|---|
| 3,089,364 | 5/1963 | Lowinger | 72/244 |
| 3,096,672 | 7/1963 | Jones | 72/DIG. 20 |
| 3,926,031 | 12/1975 | Neilsen | 72/407 |

*Primary Examiner*—Milton S. Mehr
*Attorney, Agent, or Firm*—Robert Henderson

[57] ABSTRACT

One or both opposite side portions of an edge of a workpiece of sheet material are peened to smoothness by two coacting peening tools in the form of collars oppositely acting upon said side portions through coaction with a rotary hammer resiliently carried within a housing. The two collars are slidably and rotatively carried on a stem rigidly depending from the housing and are held on the stem by an adjustable nut at the bottom of the stem. A first one of said collars is vibratorily actuated through direct action of said hammer to peen one of said side edge portions of the workpiece while the other of said collars is actuated indirectly to support and/or peen the other of said side edge portions through vibratory reaction of the hammer to its direct actuation of the first collar, which reaction is effective through said housing and its said stem.

8 Claims, 4 Drawing Figures

BURRING DEVICE WITH OPPOSITELY ACTING DEBURRING ELEMENTS

BACKGROUND OF THIS INVENTION

The present invention is an improvement on the invention disclosed in my U.S. Pat. No. 3,926,031, dated Dec. 16, 1975. While the deburring device of said patent has proven to be very effective for deburring the edges of many types and thicknesses of sheet metal, there are some instances wherein the peening tools of my said patented device tend undesirably to dig into the metal which is desired to be deburred and smoothed. This undesirable tendency is completely eliminated by the present invention.

Additionally, the device of this invention is more durable and can be manufactured more economically than my said patented device.

BRIEF DESCRIPTION OF THE DRAWING

In the accompanying drawing which illustrates the present invention.

DETAILED DESCRIPTION OF THE INVENTION

Figure 1:
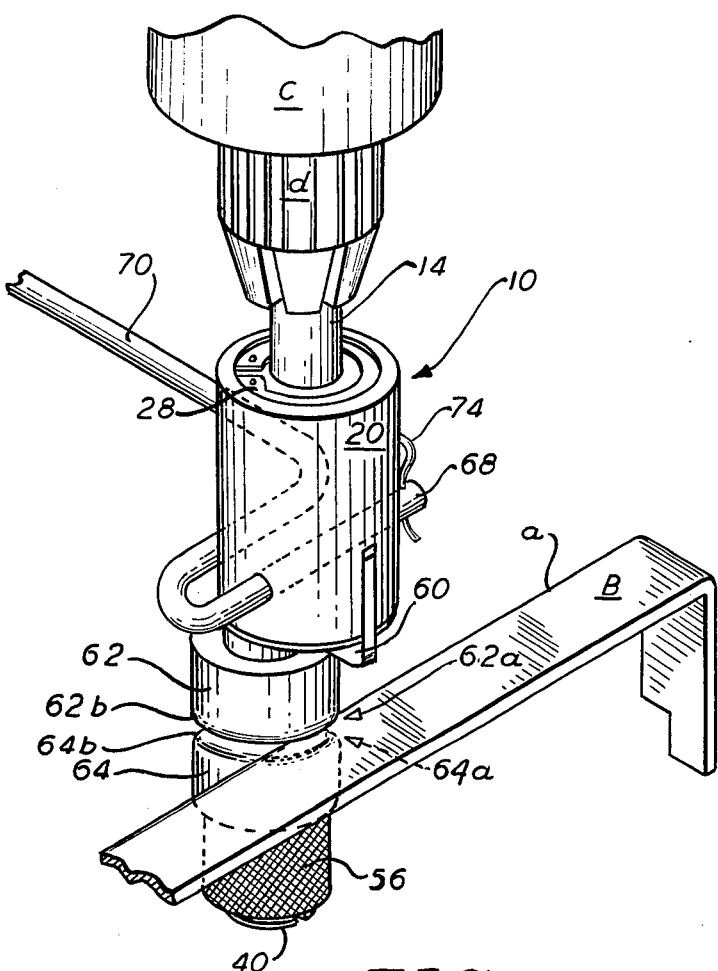
FIG. 1 is a perspective view of a deburring device according to a preferred embodiment of this invention, shown in operating position with reference to a sheet metal edge being deburred.

Referring to FIG. 1, the device, generally indicated at 10, is shown in relation to an edge *a* of a sheet metal strip B, in position to remove burrs from said edge. The device is also shown in operational relationship to a suitable motor C which is provided for operating a hammering-peening mechanism in the device.

Figure 2:
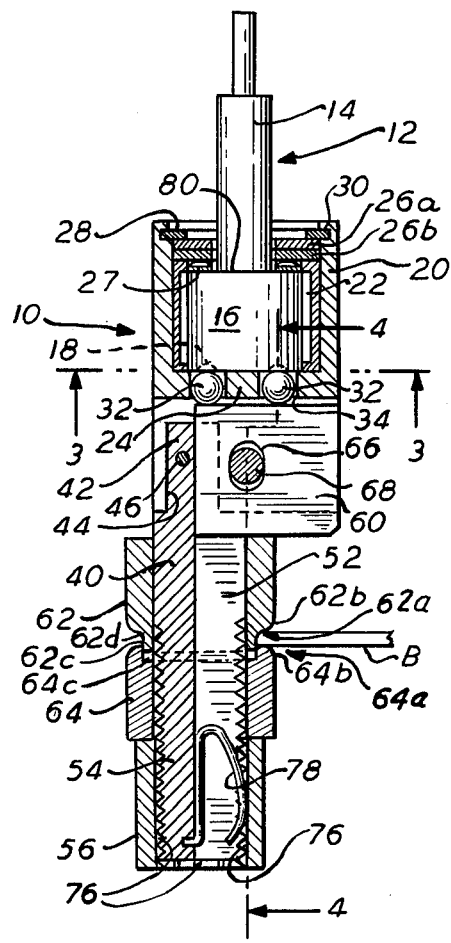
FIG. 2 is a side view of the device, some portions thereof being shown in central axial section.
Figure 4:
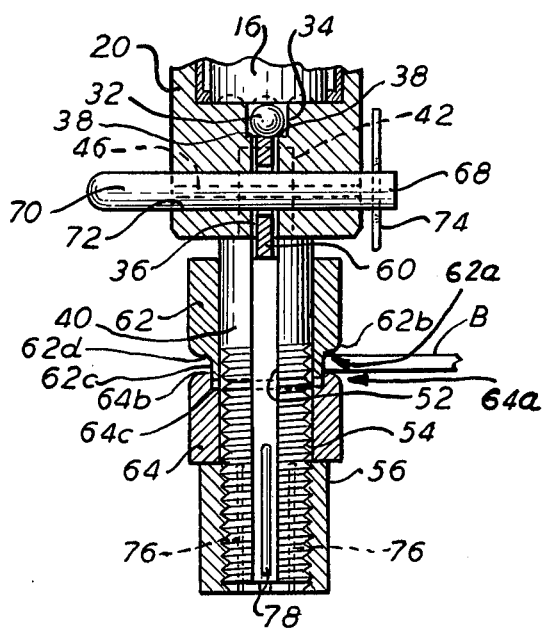
FIG. 4 is a fragmentary, axial sectional view, approximately on the irregular line 4—4 of FIG. 2.
Figure 3:
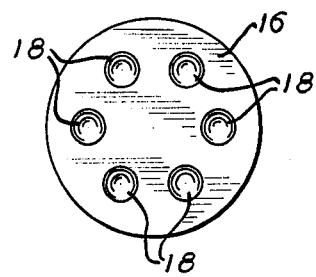
FIG. 3 is an elevational view of the bottom face of a rotary hammer, this view being on the line 3—3 of FIG. 2.

Referring also to FIGS. 2–4, the device 10 comprises a rotary hammer 12 of which a stem 14 is adapted for tight engagement within a chuck *d* of the motor C. An enlarged lower end portion 16 of the hammer has, formed on its bottom, a generally flat, circular working surface with a continuous series of concentric, frustospherical indentations 18.

The hammer's lower end portion 16 extends coaxially within the housing 20, and is borne for turning therein within a needle bearing 22. This bearing, and the hammer's portion 16, bottom upon an internal radial wall 24 of the housing. The bearing 22 and the hammer portion 16 are locked into the housing 20 by flat washers 26*a*, 26*b*, a wavy-spring washer 27, and a snap ring 28 which, by its resilience, snaps into and is retained in an inner annular recess 30 formed near the upper end of the housing.

Hard steel balls 32 are somewhat loosely disposed within separate openings 34 which are formed in the housing's radial wall 24 and are in axial alignment with the series of indentations 18. The openings 34 communicate with a slot 36 which extends centrally in the housing 20 and opens at the latter's lower end. The slot 36 is narrower than the diameters of the balls 32, thereby providing shoulders 38 at the lower ends of the openings 34 to retain the balls against dislodgment therefrom.

A sturdy stem 40, more or less like a non-headed bolt, has a reduced upper end 42 which fits tightly into a downwardly opening bore 44 formed in the slot-defining lower portions of the housing 20, between which lower portions the bore 44 is centrally located toward one side of the slot 36. The stem 40 is pinned firmly within the bore 44 by a pin 46 extending tightly through the housing 20 and the stem's upper end 42.

The stem 40 is formed with a longitudinal side channel 52 having parallel side walls and being of the same width as the slot 36 into which the upper end portion of said channel opens, enabling said channel and slot to accommodate portions of a peening tool assembly as hereinafter explained. The lower end of the stem 40 is threaded as at 54 to receive an adjusting nut 56 thereon for a purpose also hereinafter explained.

The peening tool assembly of this invention comprises an impact plate 60, preferably of flat tool steel, and two interacting, steel, peening collars 62, 64.

The impact plate 60 is approximately rectangular in shape, is of a thickness slightly less than the width of the stem's channel 52, and is disposed in said channel for limited vertical sliding therein. The plate 60 is formed with an oval aperture 66 therein, with its greater diameter extending vertically. Said plate is held slidably in place in the housing's slot 36 and in the channel 52 of the stem 40 by a reversely bent end portion 68 of a steadying rod or handle 70 which extends with an accurate fit within a transverse bore 72 in the housing 20 and with a loose fit within the oval aperture 66 of the plate 60. The rod portion 68 is held in place within the housing 20 by a cotter pin 74.

The two peening collars 62, 64 are very similar, differing only in opposed end portions 62*a* and 64*a* which interact to deburr and smooth a side edge of a workpiece B. The peening collars 62, 64 are slidably and rotatably carried on the stem 40, between the impact plate 60 and the adjusting nut 56. The lower end portion 62*a* of the uppermost peening collar 62 is formed with an inwardly curving annular outer surface 62*b* which meets a downwardly and reversely curving annular surface 62*d* which terminates at a cylindrical surface 62*c*. Said cylindrical surface extends downwardly into an annular recess 64*c* in the upper end portion 64*a* of the lowermost peening collar with an accurate sliding fit. The collar 64, also, is formed with a curving outer surface 64*b*, this surface curving inwardly to form the top extremity of the collar 64, and terminating at the upper edge of the recess 64*c*. The two peening collars 62, 64 interact to deburr and smooth the upper corner of the workpiece B; such deburring and smoothing being derived from the curved surface 62*d* while collar 64 serves as an anvil on which the workpiece rests.

The two peening collars 62, 64 are freely rotatable about the stem 40, either together or relatively independently of each other. Said collars, also, are relatively adjustable axially by threading the nut 56 either upwardly on the stem 40 to provide reduced spacing between the curved surfaces 62*b* and 64*b*, or by threading the nut 56 downwardly on said stem to provide increased spacing between said curved surfaces.

The just indicated adjustments by manipulation of the nut 56 enable the subject deburring device to be readily conditioned for deburring the edges of workpieces B of different thicknesses. In much the same way as shown in my mentioned patent, the threaded inner surface of the nut 56 is formed with a circular series of longitudinally extending grooves 76; and a wire spring 78, suitably captured in the channel 52, projects into the various grooves 76 as said nut is turned for adjustment purposes. Thus, the spring 78 holds the nut in any one of various adjustments unless the nut is forcefully turned manually.

OPERATION OF THE SUBJECT DEBURRING DEVICE

With the hammer 12 being turned at high speed by the motor C and the device as a whole being held against rotation by manual holding of the handle 70, the strip B is inserted between the curved surfaces 62b and 64b and urged forcefully into intimate relation with the cylindrical surface 62c and engagement of the strip's upper edge with the concave surface 62d. Meanwhile, the strip and the deburring device are moved relatively to each other lengthwisely of the strip. This causes the upper peening collar 62 to vibrate axially due to the engagement of its upper end with the impact plate 60 which, itself, is being vibrated axially by engagement with the balls 32 which are subject to rapid impact by intermittent seating within the indentations 18 at the bottom of the rotating hammer 12. The resulting rapid axial vibration of the peening collar 62 causes the concave, curved surface 62d to peen the upper edge portion of the strip B as the latter moves between the two peening collars, thereby deburring said upper edge portion.

As thus far explained, the lower peening collar 64 is serving as an anvil with its upper end supporting the strip B. In addition to providing such support, the collar 64 derives some vibratory effect due to the reaction of the housing 20 and the stem 40 to the coaction of the balls 32 with the indentations 18 in the hammer 12, 16 as the latter rotates. The mentioned vibration accentuates the deburring effect of the upper collar 62 upon the upper side of the edge of the workpiece.

The device of this invention may, of course, be held and used manually, or it may be used in association with a machine tool such as, for example, a drill press.

It is to be noted that the peening collars and other parts of the subject device can be economically produced with currently available machine tools. Also, noting that the peening collars are freely rotatable on the stem 40, it should be apparent that any wear of the uppermost of those collars arising from coaction with the impact plate 60 would be distributed around the entire upper surface of the uppermost collar, and would be negligible. The same is true of any wear which might possibly occur between the lower peening collar and the adjusting nut 56.

Somewhat similarly, and with even greater advantage, any possible wear at the end portions 62a and 64a of the two peening collars, which bear the brunt of the peening action, would be distributed around said end portions due to the fact that the two peening collars 62 and 64 turn on the stem 40.

It should also be apparent that this invention is subject to some possible variations and that the invention, therefore, should not be limited in scope except as specifically limited in the following claims.

I claim:

1. A deburring device for smoothing edges of sheet material, comprising intermittently acting hammer means, operating means for operating said hammer means rapidly to impart a vibratory action to said hammer means, a housing supported on and deriving vibrations from said hammer means, an extension stem rigidly integral with said housing, extending in parallelism with the direction of vibratory movement of said hammer means, an impact member loosely connected to said housing and coacting with said hammer means to be vibratorily actuated thereby, a first peening collar carried slidably and freely rotatably on said stem in position for engagement by said impact member to derive vibratory movement therefrom, a second peening collar carried slidably and freely rotatably on said stem adjacent to and in coacting relationship to said first peening collar, and adjustment means on said stem for controlling the coacting relationship of the two said collars; adjacent annular surfaces of said collars defining therebetween an annular recess for receiving a sheet material edge to be deburred, and one of said annular surfaces including a reversely curved annular surface adapted to roll and hammer upon a side edge portion of said sheet material to be deburred.

2. A deburring device according to claim 1, further characterized in that said hammer means comprise a rotary hammer supported for rotation within said housing.

3. A deburring device according to claim 2, further characterized in that said rotary hammer has an interrupted-circular working surface formed with a continuous, concentric, circular series of frusto-spherical indentations therein; and a ball retained in position to successively coact with said indentations during rotation of said hammer to repeatedly engage said impact member to vibrate the latter against said first peening collar.

4. A deburring device according to claim 3, further characterized in including a wavy, annular spring disposed between said housing and an annular surface of said hammer opposite to the latter's said working surface, to transmit vibrations of said hammer to said second peening collar through said housing, said stem, and said adjustment means.

5. A deburring device according to claim 1, further characterized in that said hammer means and housing derive vibratory movement in reaction to the hammer means' said actuation of said impact member, and that said extension stem coacts with said second peening collar to cause the latter to vibrate against the edge of a workpiece oppositely to said first peening collar.

6. A deburring device according to claim 1, further characterized in that said extension stem has a threaded portion distal from said housing, and that said adjustment means comprise a manually operable adjusting nut on said threaded portion in adjusting engagement with said second peening collar, whereby to permit adjustment of the operating relationship of the two peening collars.

7. A deburring device according to claim 1, further characterized in that said peening collars are separately formed with opposed, inwardly curved, convex, annular surfaces; one of said collars having a reversely curved, concave annular surface adjoining the inner terminus of its said convex surface and a cylindrical portion, adjoining said concave surface; and the other of said collars having an annular recess into which said cylindrical portion slidably extends.

8. A deburring device according to claim 7, further characterized in that the peening collar having the mentioned concave surface is in direct vibration-receiving engagement with said impact member.

* * * * *